(12) United States Patent
Tsukamoto et al.

(10) Patent No.: US 10,538,181 B2
(45) Date of Patent: Jan. 21, 2020

(54) SEATBACK STRUCTURE

(71) Applicants: TS TECH CO., LTD., Saitama (JP); HONDA MOTOR CO., LTD., Tokyo (JP)

(72) Inventors: Masaru Tsukamoto, Reynoldsburg, OH (US); Kristian Villanueva, Reynoldsburg, OH (US); Takuji Kaneda, Tochigi (JP); Makoto Takeuchi, Tochigi (JP); Ganesh Narayanan, Plain City, OH (US); Masakazu Okada, Dublin, OH (US)

(73) Assignees: Honda Motor Co., Ltd., Tokyo (JP); TS Tech Co., Ltd., Shioya-Gun, Tochigi (JP)

( * ) Notice: Subject to any disclaimer, the term of this patent is extended or adjusted under 35 U.S.C. 154(b) by 52 days.

(21) Appl. No.: 15/868,370

(22) Filed: Jan. 11, 2018

(65) Prior Publication Data
US 2019/0210498 A1    Jul. 11, 2019

(51) Int. Cl.
*A47C 7/00* (2006.01)
*B60N 2/58* (2006.01)
*B60N 2/72* (2006.01)
*B60N 2/68* (2006.01)

(52) U.S. Cl.
CPC .............. *B60N 2/72* (2013.01); *B60N 2/686* (2013.01); *B60N 2205/30* (2013.01)

(58) Field of Classification Search
CPC ........ B60N 2/686; B60N 2/6009; B60N 2/70; B60N 2/7094; B60N 2/72; B60R 2021/23146; B60R 21/207
See application file for complete search history.

(56) References Cited

U.S. PATENT DOCUMENTS

| | | | | |
|---|---|---|---|---|
| 5,522,645 | A * | 6/1996 | Dahlbacka | B60N 2/686 297/452.55 |
| 7,222,915 | B2 * | 5/2007 | Philippot | B60N 2/70 297/216.13 |
| 7,543,892 | B2 * | 6/2009 | Minakawa | B60N 2/58 297/452.18 |
| 8,979,204 | B2 * | 3/2015 | Awata | B60N 2/5825 297/218.3 |
| 9,616,791 | B2 * | 4/2017 | Awata | B60N 2/5825 |
| 2004/0183356 | A1 * | 9/2004 | Philippot | B60N 2/70 297/452.18 |

FOREIGN PATENT DOCUMENTS

| | | |
|---|---|---|
| JP | 2013047076 A | 3/2013 |
| WO | 2012157099 A1 | 11/2012 |

* cited by examiner

*Primary Examiner* — Shin H Kim
(74) *Attorney, Agent, or Firm* — Armstrong Teasdale LLP

(57) ABSTRACT

A seatback of a seat includes a seatback frame, a pad placed on a front side of the seatback frame, and a skin member covering a front part of the pad and extending to a rear side of the seatback frame. An inner support member is attached to the rear side of the seatback frame. A back board is attached to a rear side of the inner support member and configured to hold an edge portion of the skin member against at least an upper part of the inner support member.

20 Claims, 8 Drawing Sheets

SEATBACK STRUCTURE

TECHNICAL FIELD

The present invention relates to a seatback structure, and in particular to a seatback structure for a seatback of a vehicle seat.

BACKGROUND ART

Conventionally, a seatback attached to a rear end of a seat cushion of a vehicle seat may include a metallic seatback frame, a pad material covering a front side of the seatback frame, a skin member covering the surface of the pad material and having an edge extending to the rear side of the seatback, and a back board attached to the rear side of the seatback frame. See WO2012/157099A and JP2013-47076A, for instance.

In such a conventional seatback, there is some difficulty in eliminating a gap that may be created between the skin member and the overlying edge part of the back board particularly because the skin member is deformable owing to the underlying pad material. Such a gap is undesirable in terms of the external appearance and the commercial acceptability of the vehicle seat.

SUMMARY OF THE INVENTION

In view of such a problem of the prior art, a primary object of the present invention is to provide a seatback structure that can prevent a gap from being created between a peripheral edge of a back board of a seatback and an underlying skin member.

According to the present invention, such an object can be accomplished by providing a seatback (18) attached to a rear part of a seat cushion (16), comprising:

a seatback frame (20);
a pad (28) placed on a front side of the seatback frame;
a skin member (30) covering a front side of the pad and extending to a rear side of the seatback frame;
an inner support member (34) attached to the rear side of the seatback frame; and
a back board (36) attached to a rear side of the inner support member, and holding an edge portion (30A) of the skin member against at least an upper part (34A) of the inner support member.

By interposing the edge portion of the skin member between the inner support member and the inner support member, a gap is prevented from being created between the peripheral edge of the back board and the underlying skin member without regard to the configuration of the opposing surface of the seatback frame.

Preferably, an outer profile of the inner support member is conformal with an outer profile of an upper part of the back board, and the edge portion of the skin member is interposed between a peripheral edge (36A) of the upper part of the back board and a peripheral part of the upper part of the inner support member.

Thereby, the gap between the peripheral edge of the back board and the underlying skin member can be minimized or eliminated.

Preferably, the inner support member further includes a pair of side parts depending downward from either lateral end of the upper part of the inner support member, and the back board holds the edge portion of the skin member against the inner support member along the both the side parts and along the upper part of the inner support member.

Thereby, the gap between the peripheral edge of the back board and the underlying skin member is minimized or eliminated in a most noticeable part of the seatback at a minimum material cost.

Preferably, an outer profile of the inner support member is conformal to an outer profile of an upper part and side parts of the back board, and the edge portion of the skin member is interposed between a peripheral edge of the upper part and the side parts of the back board and the peripheral part of the upper part and the side parts of the inner support member.

Thereby, the gap between the peripheral edge of the back board and the underlying skin member is minimized or eliminated uniformly over a substantially entire periphery of the back board.

Preferably, the inner support member and the back board are made of molded plastic material.

Thereby, the mutually abutting edges and/or surfaces of the inner support member and the back board can be formed in a highly precise manner.

Preferably, the inner support member is provided with engagement portions, and the back board is provided with corresponding engagement portions, the back board being attached to the inner support member by means of an engagement between the engagement portions and the corresponding engagement portions.

Thereby, the back board can be attached to the inner support member in a simple and stable manner.

If desired, the back board may hold a edge portion of the pad along with the edge portion of the skin member against the at least upper part of the inner support member.

Owing to the resiliency of the pad, creation of a gap along the outer periphery of the back board can be even more favorably prevented.

According to a particularly preferred embodiment of the present invention, the inner support member is provided with an upper bulged portion and a lateral flange extending laterally from the upper bulged portion, and the back board is provided with a forwardly projecting peripheral edge that holds the edge portion of the skin member against the lateral flange.

Thereby, the edge portion of the skin member can be held against the lateral flange even more effectively.

Preferably, the lateral flange is provided with a forwardly extending peripheral edge that abuts an opposing surface of the seatback frame.

Thereby, the inner support member is better enabled to support the holding force that is applied by the peripheral edge of the back board onto the peripheral part of the skin member.

DESCRIPTION OF THE PREFERRED EMBODIMENT(S)

An automotive front seat provided with a seatback according to a preferred embodiment of the present invention is described in the following with reference to the appended drawings.

Figure 1:
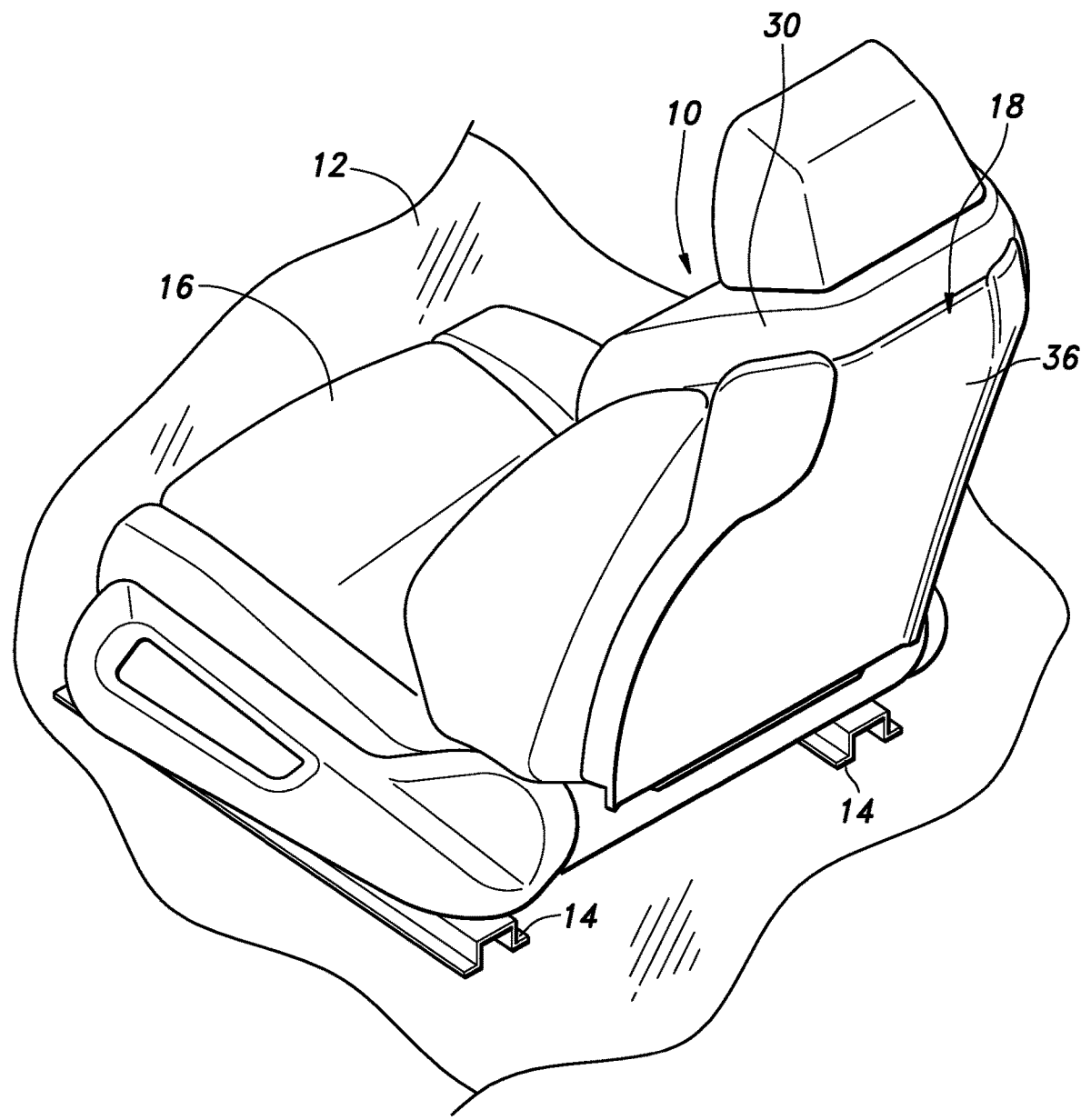
FIG. 1 is a rear perspective view of a front seat of an automobile including a seatback according to an embodiment of the present invention.

As shown in FIG. 1, the front seat 10 includes a seat cushion 16 attached to a floor panel 12 via a pair of guide rails 14 extending in the fore and aft direction so that the fore and aft position of the front seat 10 can be adjusted, and a seatback 18 attached to a rear part of the seat cushion 16.

Figure 2:
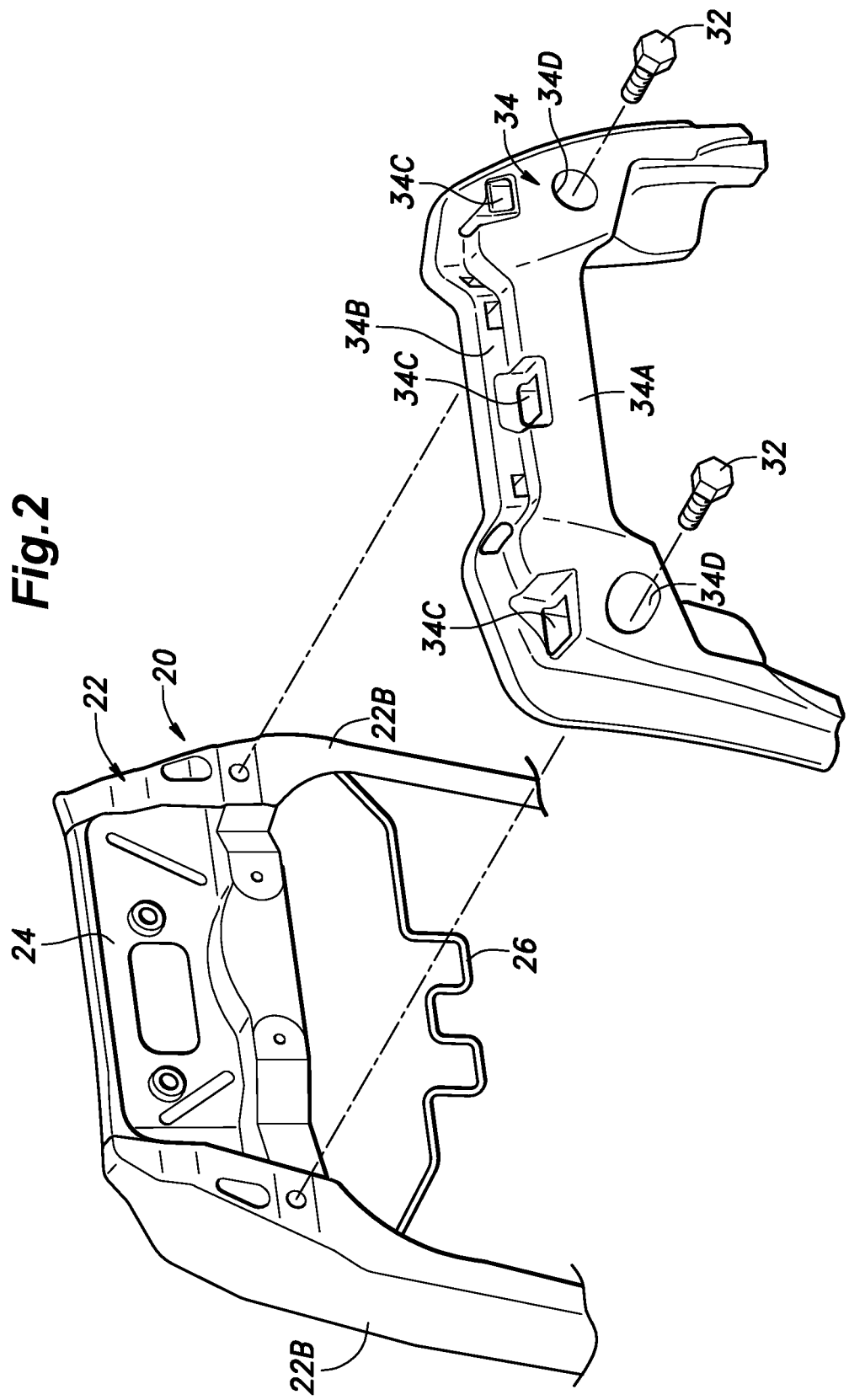
FIG. 2 is an exploded perspective view of a seatback frame and an inner support member of the seatback.
Figure 3:
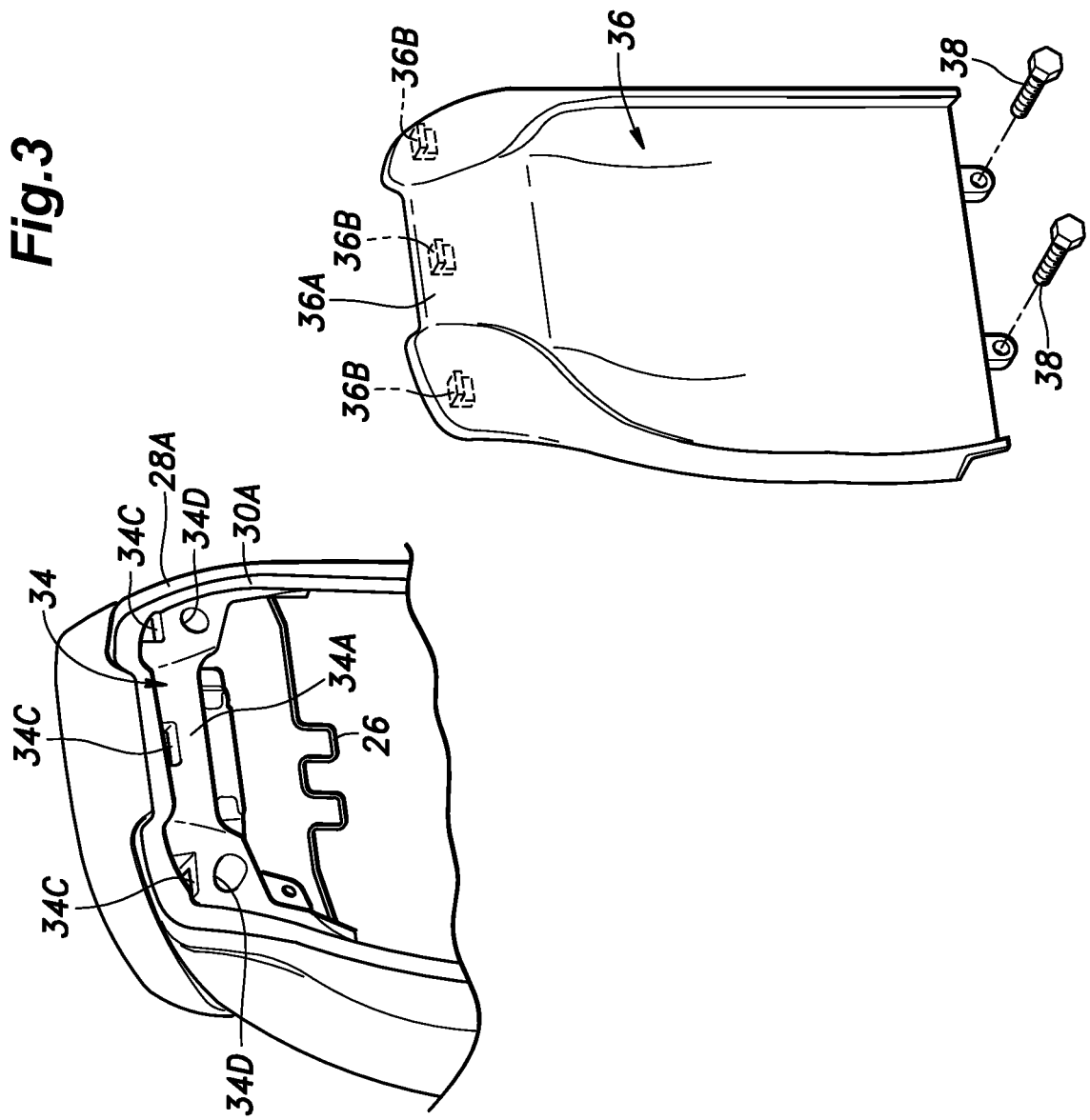
FIG. 3 is an exploded perspective view of an assembly of the seatback frame and the inner support member of a seatback, and a back board.
Figure 4:
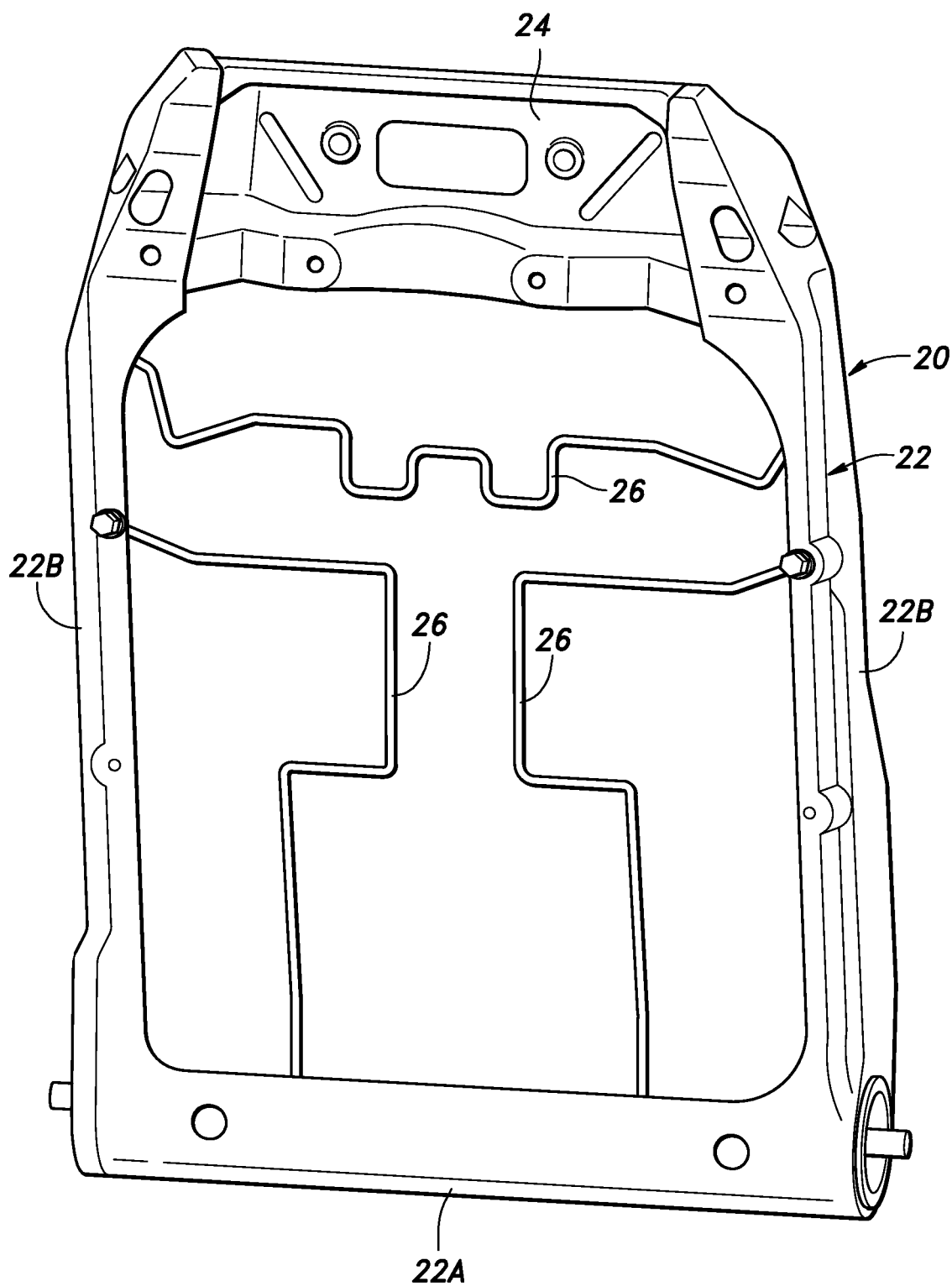
FIG. 4 is a rear perspective view of the seatback frame.
Figure 5:
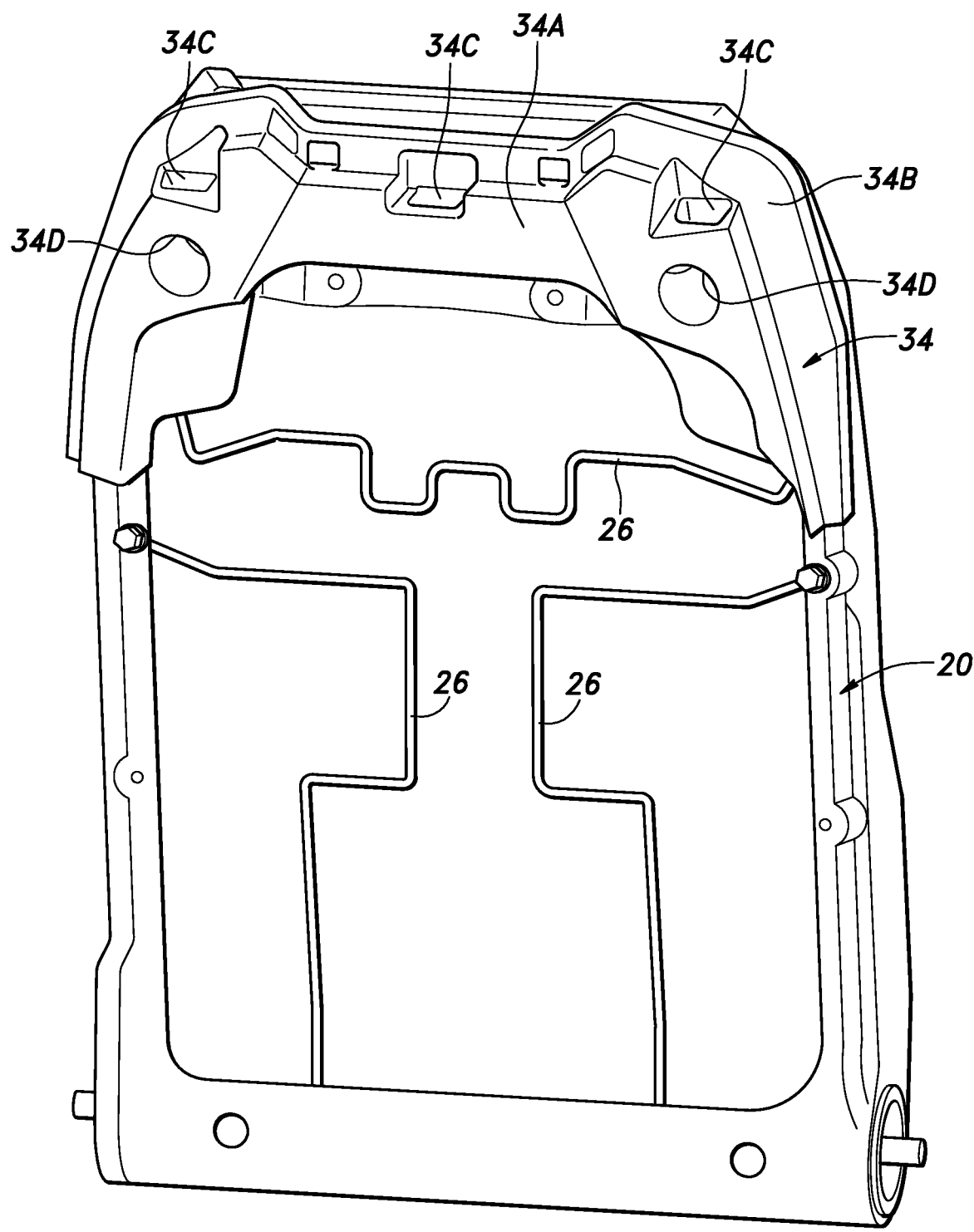
FIG. 5 is a perspective view of an assembly of the seatback frame and the inner support member.
Figure 6:
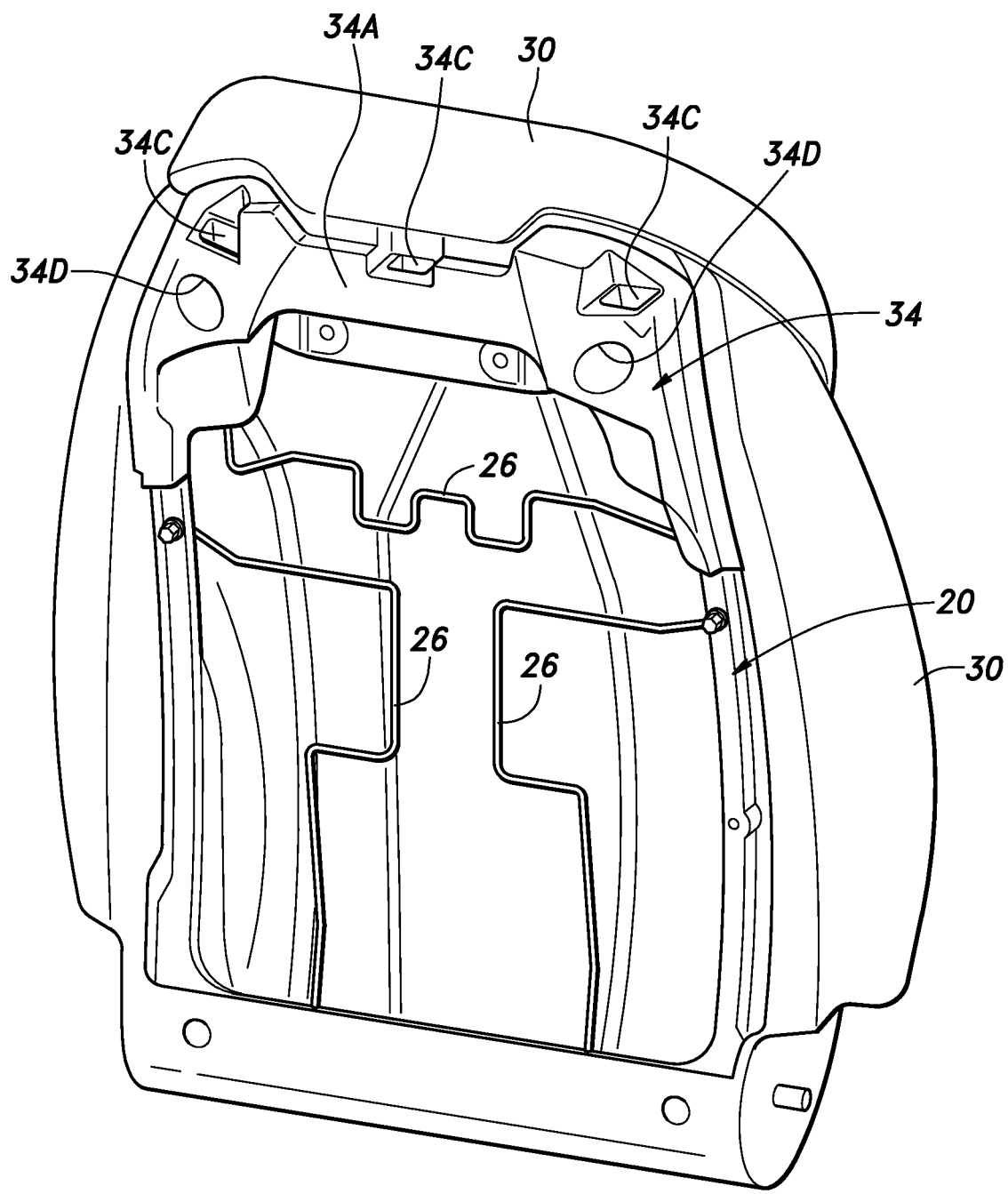
FIG. 6 is a perspective view of an assembly of the seatback frame, the inner support member, a pad and a skin member.

As shown in FIGS. 2 to 7, the seatback 18 is provided with a seatback frame 20 consisting of a skeletal frame. As shown in FIG. 4, the seatback frame 20 is generally made of stamp formed sheet metal, and includes a frame body 22 integrally combining a lower frame portion 22A, and a left and a right side frame portions 22B extending vertically upward from either end of the lower frame portion 22A, and an upper frame 24 extending between the upper ends of the side frame portions 22B. Thus, the seatback frame 20 is provided with a generally rectangular configuration defining a central opening.

The seatback frame 20 is provided with a plurality of wires 26 extending across the central opening of the seatback frame 20 for supporting a lumbar support plate (not shown in the drawings).

A pad 28 made of foamed polyurethane resin or the like is provided on the front side of the seatback frame 20. The outer surface of the pad 28 is covered by a skin member 30 made of leather, synthetic leather, cloth or the like. The pad 28 and the skin member 30 include edge portions 28A and 30A extending to the back side of the seatback frame 20 on the upper, left and right sides thereof. The edge portion 30A of the skin member 30 is secured to the seatback frame 20 by hooks not shown in the drawings.

As shown in FIG. 2, an inner support member 34 is attached to an upper part of the rear side of the seatback frame 20 by using a pair of threaded bolts 32. As shown in FIGS. 2 and 4, the inner support member 34 includes a bulged portion 34A having a substantially complementary profile to the front profile of the back board 36 (including an upper part and a pair of side parts depending downward from either lateral end of the upper part), a lateral flange 34B extending from the bulged portion 34A along the upper edge and side edges of the seatback frame 20 in a substantially conformal manner to the seatback frame 20, three openings 34C formed in parts of the bulged portion 34A adjoining the lateral flange 34B, and a pair of bolt holes 34D formed in the bulged portion 34A for receiving threaded bolts 32 for securing the inner support member 34 to the seatback frame 20.

Figure 7:
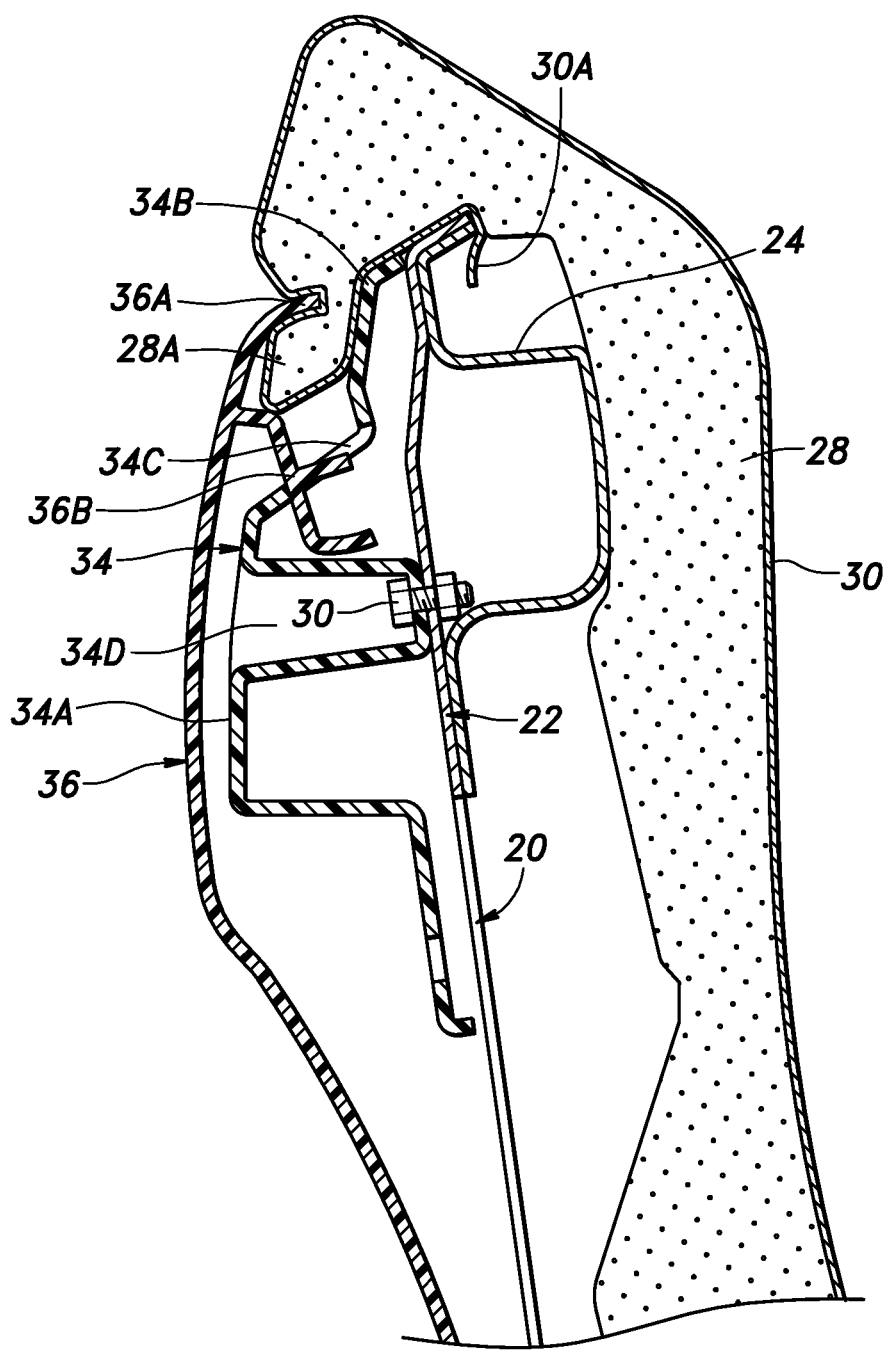
FIG. 7 is a sectional side view of an upper part of the seatback.

As shown in FIG. 7, it should be noted that the peripheral edge of the lateral flange 34B projects in the substantially forward direction. Also, the part of the bulged portion 34A surrounding each bolt hole 34D is recessed forward so as to abut the rear surface of the seatback frame 20. Therefore, the threaded bolts 32 can be fastened firmly without deforming the inner support member 34.

A back board 36 (see FIG. 1) is provided on the rear side of the seatback frame 20. As shown in FIG. 3, the back board 36 is provided with a peripheral edge 36A having a same shape as the peripheral edge of the lateral flange 34B, and three engagement claws 36B. The upper part of the back board 36 is secured to the inner support member 34 by engaging the engagement claws 36B with the corresponding openings 34C of the inner support member 34, and the lower end of the back board 36 is secured to the seatback frame 20 with a pair of threaded bolts 38 (see FIG. 3). As a result, the upper part of the back board 36 overlaps with a substantially entire part of the rear side of the inner support member 34, and is attached to the seatback frame 20 via the inner support member 34. In particular, because the engagement claws 36B are formed on the front side of the back board 36, the back side of the back board 36 may be free from any unsightly features.

The edge portion 28A of the pad 28 and the edge portion 30A of the skin member 30 are interposed between the seatback frame 20 and the back board 36 where the inner support member 34 is absent. In the region where the inner support member 34 is present (in other words, in the upper edge part and the upper parts of the left and right side edge parts of the seatback frame 20), as shown in FIG. 7, the edge portion 28A of the pad 28 and the skin member 30 are interposed between the lateral flange 34B of the inner support member 34 and the peripheral edge 36A of the back board 36. In other words, the edge portion 28A of the pad 28 and the edge portion 30A of the skin member 30 are interposed between the peripheral edge 36A of the back board and the lateral flange 34B of the inner support member 34. Furthermore, because the peripheral edge 36A of the back board 36 is pushed into the pad 28 by deforming the pad 28 along with the skin member 30, no gap is created along the edge of the back board 36. Because the pad 28 along with the skin member 30 bears upon the outer side of the forwardly extending peripheral edge 36A of the back board 36, an attempt to pry open a gap between the skin member 30 and the back board 36 is not going to be successful.

The peripheral edge of the lateral flange 34B of the inner support member 34 and the peripheral edge 36A of the back board 36 are conformal to each other. Because the peripheral edge 36A of the back board 36 projects substantially in the forward direction, and abuts the lateral flange 34B of the inner support member 34 at the free end of the peripheral edge 36A of the back board 36, the peripheral edge 36A of the back board 36 is enabled to hold the edge portion of the pad 28 and the skin member 30 against the lateral flange 34B of the inner support member 34 without creating any gap along the outer periphery of the back board 36. Furthermore, because the edge of the lateral flange 34B of the inner support member 34 also projects in the forward direction, the inner support member 34 can be supported by the seatback frame 20 in stable manner.

Because both the inner support member 34 and the back board 36 are made of molded plastic members, the peripheral edge 36A of the back board 36 can be accurately conformed to the lateral flange 34B of the inner support member 34 in a highly precise manner.

By interposing the inner support member 34 between the upper part of the back board 36 and the corresponding part of the seatback frame 20, the peripheral edge of the back board 36 is allowed to clamp the edge portions 28A and 30A of the pad 28 and the skin member 30 without creating any significant gap so that the external appearance and hence the commercial value of the vehicle seat 10 can be enhanced.

Figure 8:
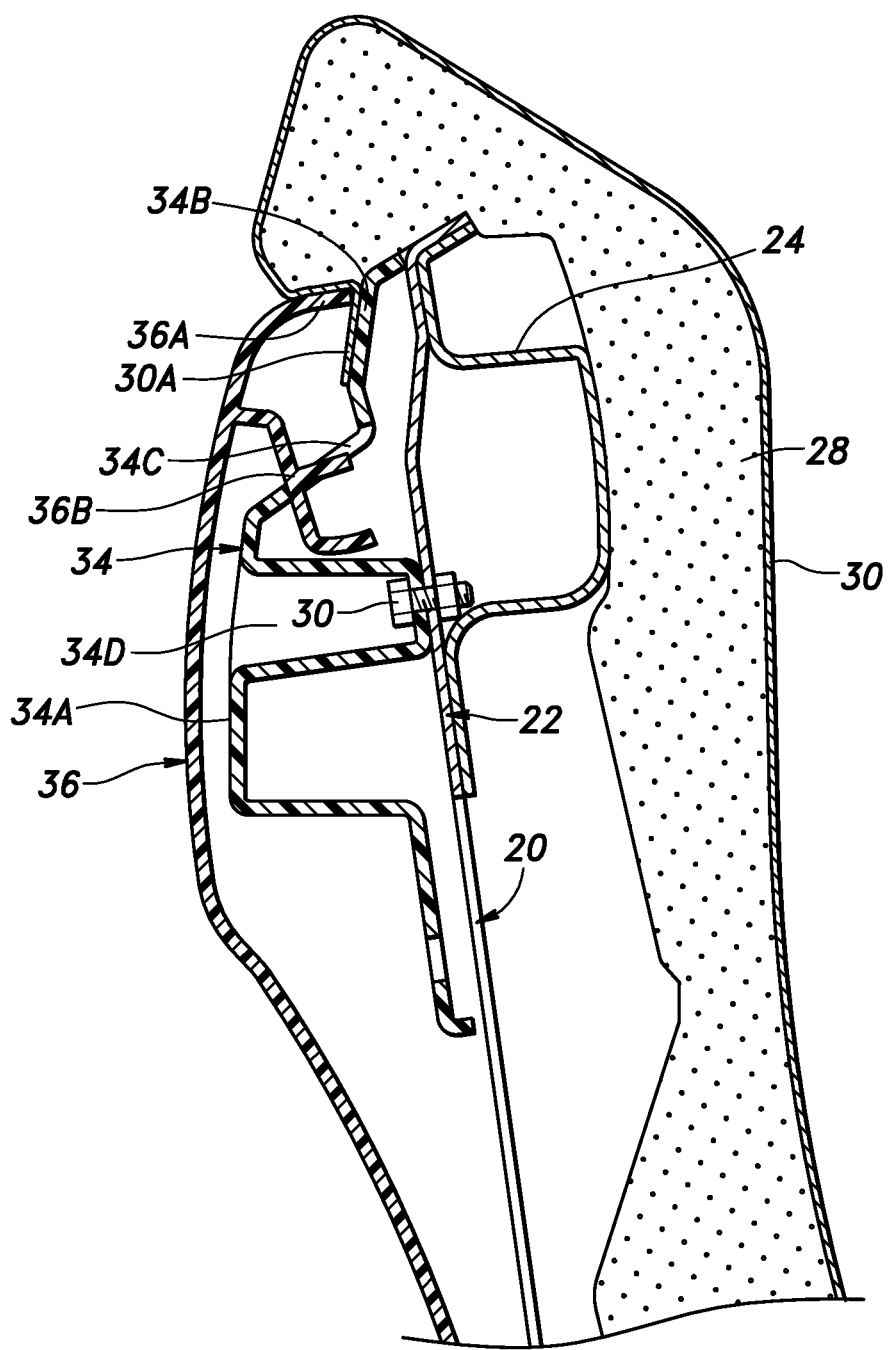
FIG. 8 is a view similar to FIG. 7 showing a modified embodiment of the present invention.

FIG. 8 shows a modification of the foregoing embodiment, and the parts of the modified embodiment corresponding to those of the foregoing embodiment are denoted with like numerals without necessarily repeating the description of such parts. In the embodiment shown in FIG. 8, only the edge portion 30A of the skin member 30 is interposed between the back board 36 and the inner support member 34, and the pad 28 bears upon the outer side of the forwardly extending peripheral edge 36A of the back board 36. In this case also, no gap is created along the outer periphery of the back board 36, and an attempt to create a gap can be defeated.

10: front seat
12: floor panel
14: guide rail
16: seat cushion
18: seatback
20: seatback frame
22: frame body
22A: lower frame portion
22B: side frame portion
24: upper frame
26: wire
28: pad
28A: edge portion
30: skin member
30A: edge portion
32: bolt
34: inner support member
34A: bulged portion
34B: lateral flange
34C: opening (engaged portion)
34D: screw stopper hole
36: back board
36A: peripheral edge
36B: engaging claw (engaging portion)
38: bolt

The invention claimed is:

1. A seatback of a seat, comprising:
a seatback frame;
a pad placed on a front side of the seatback frame;
a skin member covering a front part of the pad and extending to a rear side of the seatback frame;
an inner support member attached to the rear side of the seatback frame; and
a back board attached to a rear side of the inner support member, and configured to hold an edge portion of the skin member against at least an upper part of the inner support member,
wherein the inner support member is disposed between the back board and the seatback frame.

2. The seatback according to claim 1, wherein an outer profile of the inner support member is conformal with an outer profile of an upper part of the back board, and the edge portion of the skin member is interposed between a peripheral edge of the upper part of the back board and a peripheral part of the upper part of the inner support member.

3. The seatback according to claim 2, wherein the inner support member further includes a pair of side parts depending downward from either lateral end of the upper part of the inner support member, and the back board holds the edge portion of the skin member against the inner support member along the both the side parts and along the upper part of the inner support member.

4. The seatback according to claim 3, wherein an outer profile of the inner support member is conformal to an outer profile of an upper part and side parts of the back board, and the edge portion of the skin member is interposed between a peripheral edge of the upper part and the side parts of the back board and the peripheral part of the upper part and the side parts of the inner support member.

5. The seatback according to claim 1, wherein the inner support member and the back board are made of molded plastic material.

6. The seatback according to claim 1, wherein the inner support member is provided with engagement portions, and the back board is provided with corresponding engagement portions, the back board being attached to the inner support member by means of an engagement between the engagement portions and the corresponding engagement portions.

7. The seatback according to claim 1, wherein the back board holds an edge portion of the pad along with the edge portion of the skin member against the at least upper part of the inner support member.

8. The seatback according to claim 1, wherein the inner support member is provided with an upper bulged portion and a lateral flange extending laterally from the upper bulged portion, and the back board is provided with a forwardly projecting peripheral edge that holds the edge portion of the skin member against the lateral flange.

9. The seatback according to claim 8, wherein the lateral flange is provided with a forwardly extending peripheral edge that abuts an opposing surface of the seatback frame.

10. A seatback of a seat, comprising:
a seatback frame;
a pad placed on a front side of the seatback frame;
a skin member covering a front part of the pad and extending to a rear side of the seatback frame;
an inner support member attached to the rear side of the seatback frame; and
a back board attached to a rear side of the inner support member, and configured to hold an edge portion of the skin member against at least an upper part of the inner support member,
wherein the inner support member and the back board are made of molded plastic material.

11. The seatback according to claim 10, wherein an outer profile of the inner support member is conformal with an outer profile of an upper part of the back board, and the edge portion of the skin member is interposed between a peripheral edge of the upper part of the back board and a peripheral part of the upper part of the inner support member.

12. The seatback according to claim 10, wherein the inner support member is provided with engagement portions, and the back board is provided with corresponding engagement portions, the back board being attached to the inner support member by means of an engagement between the engagement portions and the corresponding engagement portions.

13. The seatback according to claim 10, wherein the back board holds an edge portion of the pad along with the edge portion of the skin member against the at least upper part of the inner support member.

14. The seatback according to claim 10, wherein the inner support member is provided with an upper bulged portion and a lateral flange extending laterally from the upper bulged portion, and the back board is provided with a forwardly projecting peripheral edge that holds the edge portion of the skin member against the lateral flange.

15. The seatback according to claim 14, wherein the lateral flange is provided with a forwardly extending peripheral edge that abuts an opposing surface of the seatback frame.

16. A seatback of a seat, comprising:
a seatback frame;
a pad placed on a front side of the seatback frame;

a skin member covering a front part of the pad and extending to a rear side of the seatback frame;

an inner support member attached to the rear side of the seatback frame; and a back board attached to a rear side of the inner support member, and configured to hold an edge portion of the skin member against at least an upper part of the inner support member, wherein the inner support member is provided with engagement portions, and the back board is provided with corresponding engagement portions, the back board being attached to the inner support member by means of an engagement between the engagement portions and the corresponding engagement portions.

17. The seatback according to claim 16, wherein an outer profile of the inner support member is conformal with an outer profile of an upper part of the back board, and the edge portion of the skin member is interposed between a peripheral edge of the upper part of the back board and a peripheral part of the upper part of the inner support member.

18. The seatback according to claim 16, wherein the back board holds an edge portion of the pad along with the edge portion of the skin member against the at least upper part of the inner support member.

19. The seatback according to claim 16, wherein the inner support member is provided with an upper bulged portion and a lateral flange extending laterally from the upper bulged portion, and the back board is provided with a forwardly projecting peripheral edge that holds the edge portion of the skin member against the lateral flange.

20. The seatback according to claim 19, wherein the lateral flange is provided with a forwardly extending peripheral edge that abuts an opposing surface of the seatback frame.

* * * * *